Sept. 29, 1970  J. H. WILSON  3,530,965
CLUTCH OR BRAKE FLUID COOLING SYSTEM
Filed April 9, 1969  4 Sheets-Sheet 1

JOHN HART WILSON
INVENTOR.

BY

Wayland D. Keith
HIS AGENT

Sept. 29, 1970                    J. H. WILSON                    3,530,965
                    CLUTCH OR BRAKE FLUID COOLING SYSTEM
Filed April 9, 1969                                         4 Sheets-Sheet 2
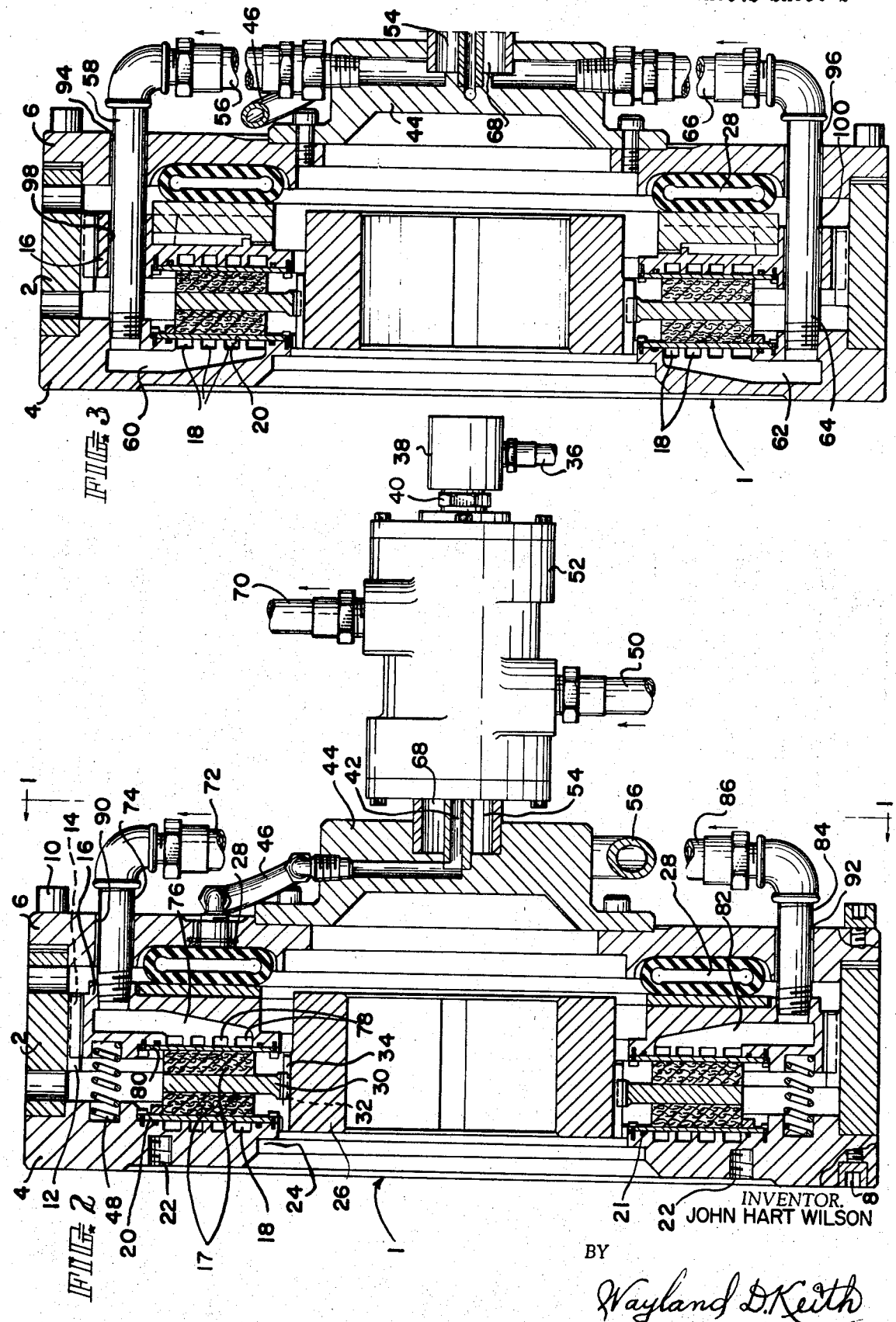
INVENTOR.
JOHN HART WILSON
BY
Wayland D. Keith
HIS AGENT

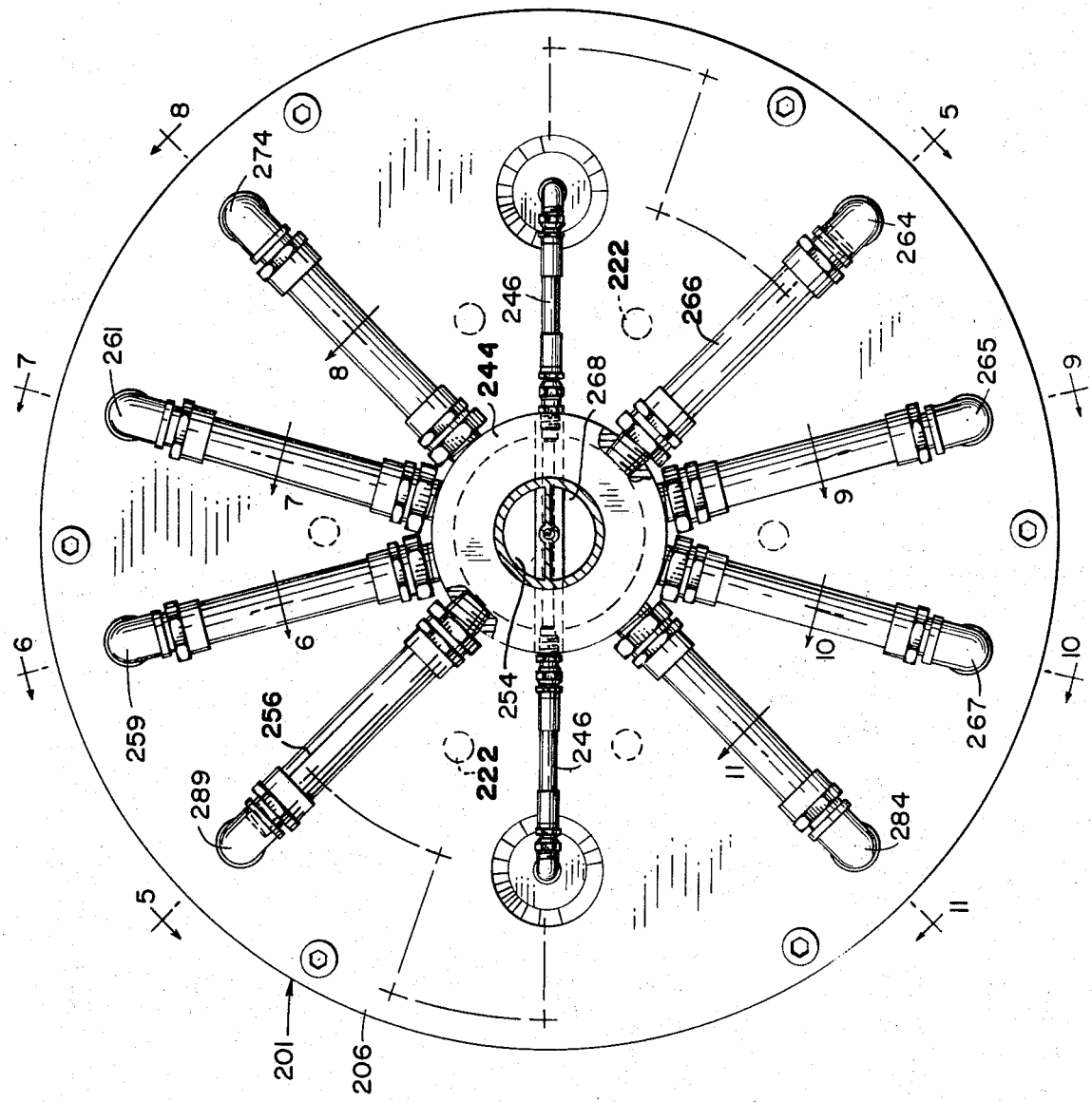

Sept. 29, 1970  J. H. WILSON  3,530,965
CLUTCH OR BRAKE FLUID COOLING SYSTEM
Filed April 9, 1969  4 Sheets-Sheet 4
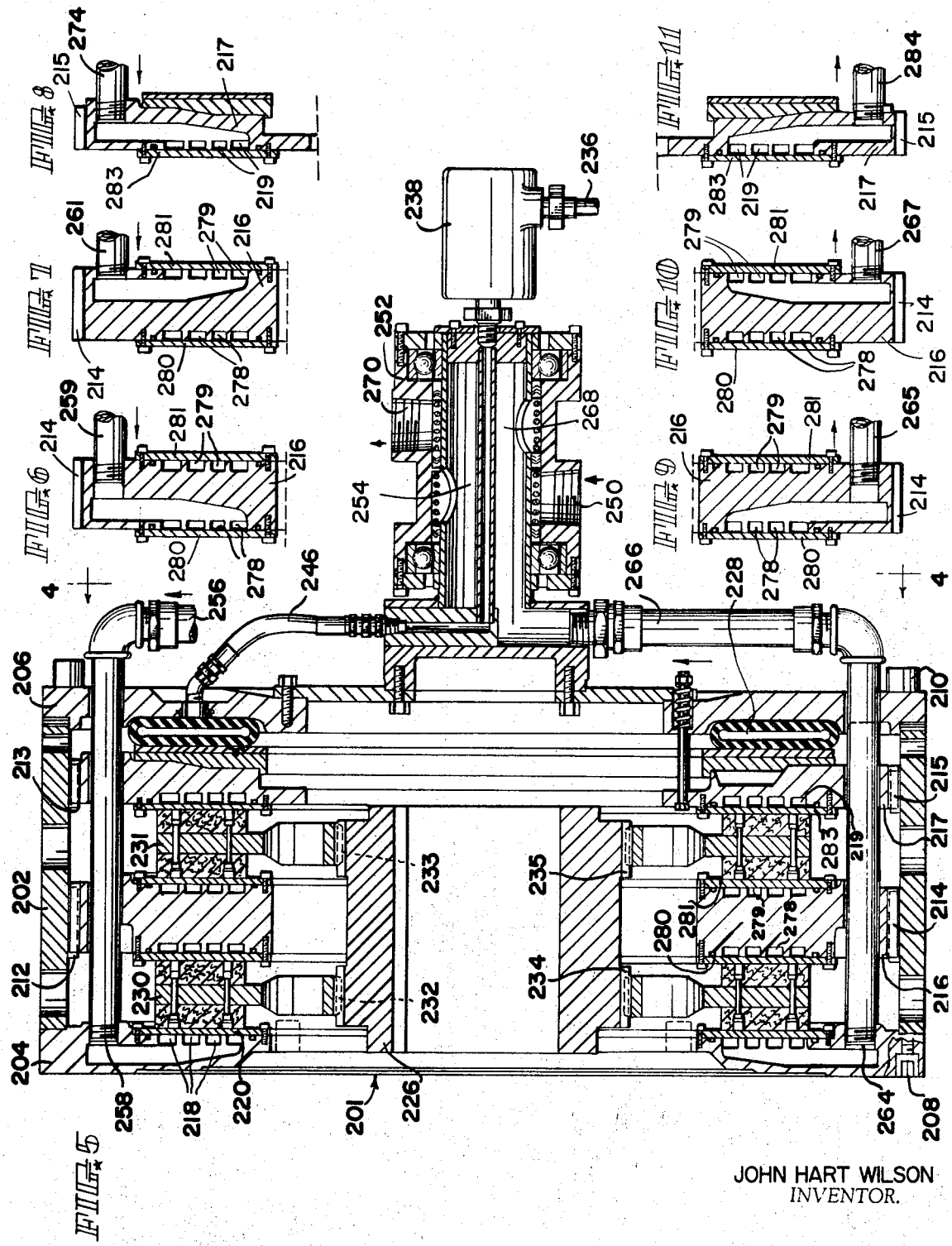
JOHN HART WILSON
INVENTOR.
BY
Wayland D. Keith
HIS AGENT

United States Patent Office 3,530,965
Patented Sept. 29, 1970

3,530,965
CLUTCH OR BRAKE FLUID COOLING SYSTEM
John Hart Wilson, c/o Wilson Manufacturing Co.,
P.O. Box 1031, Wichita Falls, Tex. 76307
Continuation-in-part of application Ser. No. 713,094,
Mar. 14, 1968. This application Apr. 9, 1969, Ser.
No. 814,739
Int. Cl. F16d *13/72*
U.S. Cl. 192—113
11 Claims

ABSTRACT OF THE DISCLOSURE

A fluid cooling system for clutches or brakes which directs a cooling fluid, such as water or the like, to the interior of the clutch or brake so the circulation of cooling fluid is directed to complementary friction elements so as to dissipate the heat created between the friction elements in the braking or clutching operation. Provision is made to direct the cooling fluid into rotating clutches through rotary fluid seals into and through the clutch or brake elements and to be discharged out through the rotary fluid seal, or cooling fluid may be directed directly into the body of a non-rotating brake element to dissipate the heat in a similar manner. Resilient conduits are connected between distribution rings, which resilient conduits lead to the interior of the clutch or brake, so as to permit movement of the conduits and brake or clutch elements while fluid is being circulated therethrough.

---

This is a continuation-in-part of my co-pending application Ser. No. 713,094, Method of and Apparatus for Maintaining Constant Tension on the Drill Pipe of a Rotary Drilling Rig From a Floating Platform or the Like, filed Mar. 14, 1968.

Various fluid actuated clutches and brakes have been proposed heretofore, but the cooling of such brakes and clutches with a cooling fluid, such as water, has presented certain problems in the transmitting of actuating fluid and the cooling fluid to and away from the clutch or brake.

The present device is so constructed as to permit the free operation of the interior portion of the clutch or brake without interference from cooling conduits which pass thereinto to be connected to the various elements having cooling passages formed therein.

The present clutch or brake is so constructed that the pressure actuating fluid and the cooling fluid are passed into and out of the clutch or brake while the clutch or brake is rotating or while the clutch or brake is not rotating, thereby enabling the circulation of the actuating fluid, and of the cooling fluid therethrough and therefrom at all times.

Clutches or brakes of this character preferably have copper wear plates which readily dissipate heat, and the cooling fluid, such as water, is circulated in heat exchange relation to and through the passages within the clutch or brake body and out through conduits leading therefrom.

An object of this invention is to provide a fluid actuated, fluid cooled clutch or brake, which clutch or brake is capable of being slipped continuously over a long period of time without becoming heated to such an extent as to damage the friction elements.

Another object of the invention is to provide a cooling system for a clutch or brake, wherein the cooling fluid is passed into and through a non-rotatable fluid seal and thence into and through conduits and into and through the clutch or brake body for distribution to and through the passages in the stationary and movable friction elements for cooling these friction elements.

A further object of the invention is to provide a clutch or brake whereby the cooling fluid therefor is passed into the clutch or brake parallel to the axis thereof.

Still another object of the invention is to provide a clutch or brake which has fluid conduits for passing cooling fluid into the friction elements of the clutch or brake, some of which fluid conduits are relatively movable with respect to the clutch or brake housing.

Yet another object of the invention is to provide a piping system for either single or multiple disc clutches or brakes, whereby a cooling fluid, such as water, may be circulated in contact relation with the wear plates of the clutch or brake so as to maintain the wear plates at a temperature below which they would be damaged by the heat generated by the friction elements which may be continuously slipped under load.

Still a further object of the invention is to provide a piping system for a clutch or brake which connects to the internal passages within the clutch or brake, so that certain clutch elements to which the conduits ar connected are yieldable.

Yet another object of the invention is to provide a clutch or brake piping system which connects, by conduits, to a distributor ring, so the outflowing fluid and the inflowing fluid may be directed through a dual rotary seal thereinto and therefrom through one connection.

Still another object of the invention is to provide a clutch or brake piping system which is simple in construction, easy to install and to remove and which is so designed that a rotating body, having the piping system associated therewith, is readily balanced.

With these objects in mind and others which will become apparent as the description proceeds, reference is to be had to the accompanying drawings in which like reference characters designate like parts in the several views thereof in which:

FIG. 2 is a sectional view taken approximately on the line 2—2 of FIG. 1, looking in the direction indicated by the arrows showing certain internal connections within the body of the clutch or brake, and showing two rotary fluid seals thereon;

FIG. 3 is a view similar to FIG. 2 but taken approximately on the line 3—3 of FIG. 1, looking in the direction indicated by the arrows, but showing conduits connected to other fluid passages within the clutch or brake;

FIG. 4 is a sectional view of a modification taken on the line 4—4 of FIG. 5, looking in the direction indicated by the arrows, with parts broken away and with parts shown in elevation;

Figure 1:
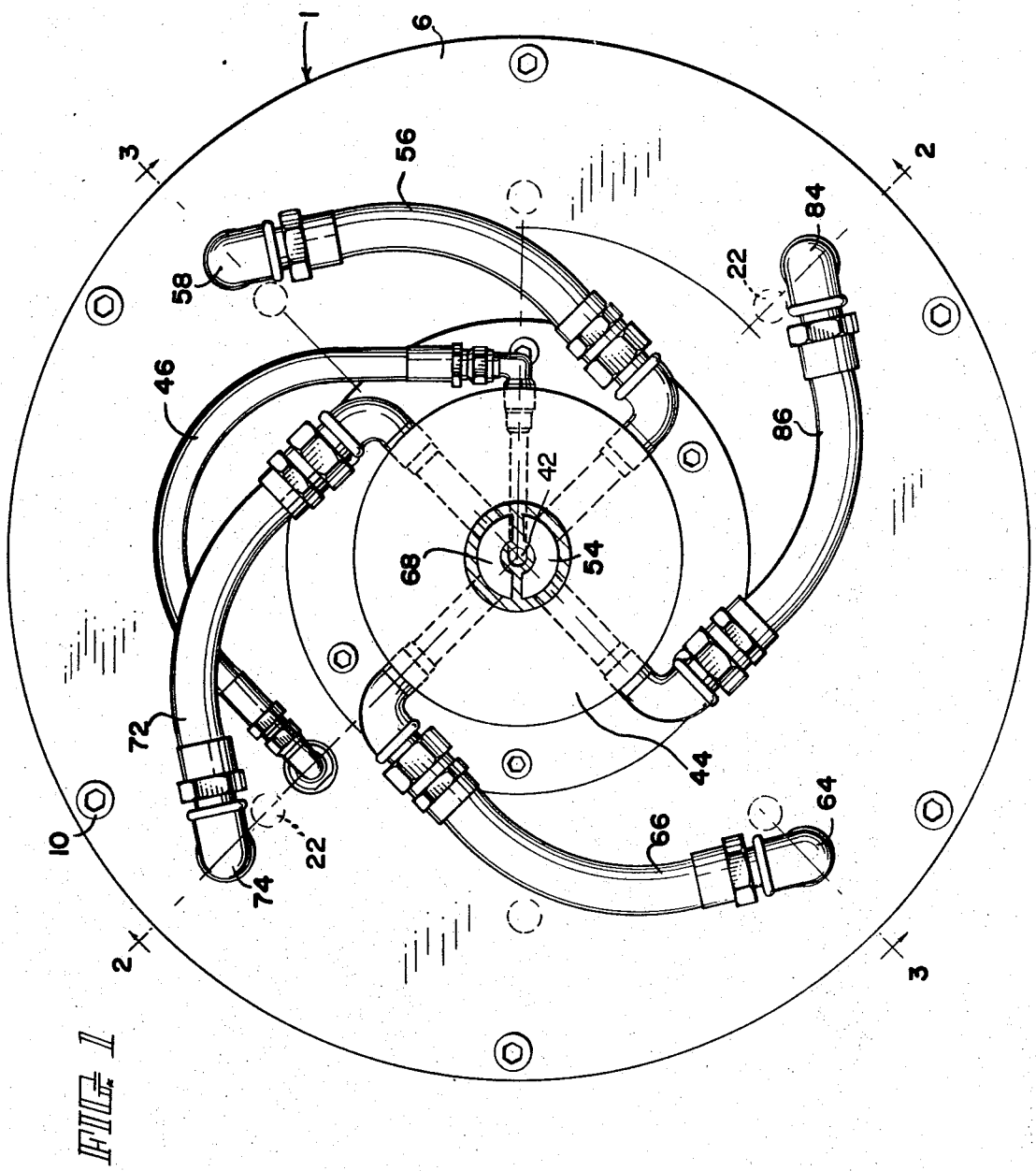
FIG. 1 is a sectional elevational view taken on the line 1—1 of FIG. 2, looking in the direction indicated by the arrows, showing the fluid conduit arrangement of the form of the invention which utilizes a single plate construction.

FIG. 5 is a sectional view taken on the line 5—5 of FIG. 4, looking in the direction indicated by the arrows, to show the longitudinal section through the clutch or brake body, the friction plates, the wear plates and through the dual rotary fluid seal, with the rotary seal for air being shown in elevation, and showing pipe connected to the stationary portion of the clutch to direct a cooling fluid therethrough;

FIG. 6 is a fragmentary sectional view taken on the line 6—6 of FIG. 4, looking in the direction indicated by the arrows, to show the connection of the fluid conduit to the passages within the movable body, for passage of cooling fluid therethrough;

FIG. 7 is a fragmentary sectional view taken on the line 7—7 of FIG. 4, looking in the direction indicated by the arrows, to show other connections to the movable body, as shown in FIG. 6, for passage of cooling fluid therethrough;

FIG. 8 is a fragmentary sectional view taken on the line 8—8 of FIG. 4, looking in the direction indicated by the arrows, to show cooling fluid connections with another movable body;

FIG. 9 is a fragmentary sectional view taken on the line 9—9 of FIG. 4, looking in the direction indicated by the arrows, of the same member as shown in FIG. 6, but showing a fluid connection on the opposite side thereof to permit circulation of cooling fluid through the passages therein;

FIG. 10 is a fragmentary sectional view taken on the line 10—10 of FIG. 4, looking in the direction indicated by the arrows, to show another portion of the movable body, as shown in FIG. 7, and showing a conduit connected thereto, to circulate a cooling fluid therethrough; and FIG. 11 is a fragmentary sectional view taken on the line 11—11 of FIG. 4, looking in the direction indicated by the arrows, and showing another portion of the movable body shown in FIG. 8, and showing a fluid conduit connected thereto for circulating cooling fluid therethrough.

With more detailed reference to the drawings, the numeral 1 designates generally a single plate clutch or brake assembly, which assembly has a cylindrical housing 2, which housing has end plates 4 and 6 thereon. The end plates 4 and 6 are secured to the cylindrical housing 2 by the respective bolts 8 and 10. The cylindrical housing 2 has internal teeth 12 therein to complementally receive the external teeth 14 on the periphery of the axially movable clutch member 16, which has a friction element 17 thereon.

The end plate 4 of clutch 1 has annular passages 18 formed therein for passage of cooling fluid therethrough. A complementary friction element or wear plate 20 is secured to the end plate 4 so as to form a seal therewith to retain the cooling fluid within the annular passages 18 in end plate 4.

When used as a clutch, with the cylindrical housing 2 and end plates 4 and 6 rotating to drive a driven member, the driven member is bolted to the clutch 1 by bolts threadably engaging screw threaded holes 22 therein to secure the clutch to the drive member with the counterbore 24 centering the clutch with respect to the drive member (not shown).

The clutch assembly has a toothed hub member 26 fitted on a shaft and keyed thereto and rotatable therewith so the friction members 17 engage wear plates 20 and 80 by movable clutch member 16 urging the friction members 17 into engagement with the wear plates by the expansion of an axially expansible fluid chamber or tube 28, which chamber is expanded by air under pressure. The cylindrical housing 2 with the respective end plates 4 and 6 will drive through friction members 17 and clutch plate 30, which plate has internal teeth 32 therein to complementally engage external teeth 34, on toothed hub member 26. The interengagement of teeth 32 and 34 will cause unitary rotation of toothed hub member 26 with cylindrical housing 2 and end plates 4 and 6.

The air, to actuate axially expansible fluid chamber or tube 28, is supplied through fluid supply conduit 36 which supplies fluid, such as air under pressure, to rotary fluid seal connection 38 so as to transfer fluid from the non-rotating connection member 38 into an axial member 40 so as to pass air through passage 42 into distributor ring 44, thence into air conduit 46 which connects with axially expansible tube 28. Upon release of fluid pressure, such as air pressure, from conduit 36, the fluid will be discharged from axially expansible tube 28, whereupon the springs 48 will urge movable clutch member 16 away from friction members 17, whereupon, the toothed hub member 26 will cease to be rotated by the cylindrical housing 2.

Cooling fluid is circulated from inlet conduit 50 into dual rotary fluid seal 52, which is shown in section in FIG. 5, and passing into the conduit 54 therein and thence into distributor ring 44 and out through conduit 56, FIG. 3, and through pipe 58 into water inlet passage 60. Whereupon, the cooling fluid, such as water, will be directed into annular passages 18 and will flow arcuately in both directions in annular passages 18 to the opposite side of the end plate 4 and will then pass into water outlet passage 62 and thence into outlet pipe 64 which connects with conduit 66, which conduit leads to the distributor ring 44 to connect with the passage 68. The cooling fluid will then pass into dual rotary fluid seal 52 and out through conduit 70 to dissipate the heat from wear plate 20 which is secured to end plate 4.

Cooling fluid will be directed simultaneously from the distributor ring 44 into inlet conduit 72, FIG. 2, thence into pipe 74 which is connected with movable clutch member 16, so cooling fluid will be directed into the inlet passage 76. Whereupon, the cooling fluid will be directed into annular passages 78 and thence arcuately in both directions in contact relation with wear plate 80, which is secured in fluid tight relation with movable clutch member 16. The cooling fluid will be directed out of the annular passages 78 into outlet passage 82, to which outlet passage an outlet pipe 84 is connected, so as to direct the cooling fluid into fluid return conduit 86 and thence into distributor ring 44 and into passage 88 to pass into and out of dual rotary fluid seal 52 and into fluid outlet conduit 70. This will maintain the wear plates 20 and 80 at a temperature below that at which the friction elements 17 or the wear plates 20 and 80 will be damaged by heat.

The end plate 6 has holes 90 and 92 formed therein, which holes are parallel to the axis of the cylindrical housing 2 and are sufficiently larger than the respective pipes 74 and 84, that the pipes may move within holes 90 and 92 respectively in parallel relation with respect to the axis of cylindrical housing 2. Upon movement of movable clutch member 16 either by the action of axially expansible tube 28 or by action of springs 48, the flexible conduit 72, which is interconnected between pipe 74 and distributor ring 44, flexes sufficiently to permit movement of movable clutch member 16 without causing undue strain thereon. Likewise, a return conduit 86 is flexible and will yield sufficiently to permit the movement of the movable clutch member 16 and pipe 84 without causing undue strain on the conduits or on the movable clutch member 16. In this manner the cooling fluid is circulated directly into the clutch housing by pipes passing thereinto from the same side of the clutch or brake as that on which the dual rotary fluid seal is located, through which the cooling fluid passes. Furthermore, this arrangement enables the balancing of a clutch both statically and dynamically with a minimum of effort, as all components of the conduit system may be cut to the exact length and weight.

Holes 94 and 96 are provided to receive pipes 58 and 64 therethrough, which pipes are not movable longitudinally upon the operation of the clutching mechanism therein, however, pipes 58 and 64 pass through holes 98 and 100, which are formed within movable clutch member 16, which holes are sufficiently large to permit free movement of the movable clutch member 16 for permitting the cooling fluid to flow through pipes 58 and 64. Pipes 58 and 64 and other components, such as conduits and fittings connected to the respective pipes, are of such weight that the clutch unit can be readily balanced both statically and dynamically thereby to present a pipe system which will transmit fluid both to the end plate 4, which is not axially movable, and to the clutch member 16, which is axially movable. The fluid will thus circulate through the annular passages in these respective members while the clutch is operating at high speed so as to sufficiently cool the clutch and yet present a clutch with a minimum of exposed conduits for the functions performed.

When the unit is used as a brake, the cylindrical housing 2 and end plates 4 and 6 are secured against rotation by bolts engaging holes 22 to secure the body to a non-rotatable element, and the shaft (not shown) that is connected to toothed hub member 26 is keyed thereto for rotation therewith. Whereupon, to retard the rotation of a shaft connected to the toothed hub member 26, fluid under pressure, such as air, is directed through fluid supply conduit 36 and to and through axial passage 42 and through air conduit 46 into axially expansible tube 28, whereby fluid under pressure, such as air, is impressed on the axially expansible tube the desired amount to cause the desired friction engagement between friction members 17 and wear plates 20 and 80 to obtain the desired braking of the rotating shaft which is connected to the toothed hub member 26. The cooling fluid passing therethrough will dissipate the heat so as to enable the friction elements and the complementary wear plates, which are preferably made of copper, to be maintained at a temperature which will not injure the elements, even if continuously braked.

MODIFIED FORM OF THE INVENTION

A modified form of the invention is shown in FIGS. 4 through 11, which is a multi-plate clutch or brake and, in the present instance, shows a two plate clutch or brake unit, which is designated generally by the numeral 201, which unit has a cylindrical housing 202 with an end plate 204 on one end and an end plate 206 secured to the opposite end thereof. Bolts 208 and 210 secure the end plates to the cylindrical housing 202 in a manner as will best be seen in FIG. 5. The cylindrical housing 202 has internal teeth 212 and 213 to complementally receive the external teeth 214 and 215 on the respective movable clutch or brake members 216 and 17. The end plate 204 has annular passages 218 formed therein, one side of each annular passage is closed by a wear plate 220 in sealed relation, as the wear plate is secured to end plate 204.

When the unit 201 is used as a clutch, the end plate 204 is secured to the drive member by bolts threadably engaging screw threaded holes 222 in the manner as set out in the aforementioned form of the invention. A counterbore 224 is formed in the end plate 204 so as to abut with the driven member on which the unit is fitted, in event the unit is used as a clutch.

A toothed hub member 226 is adapted to fit on a shaft and be keyed thereto for rotation therewith. The toothed hub member 226 has two rows of external teeth 234 and 235, respectively, therearound, which rows of teeth are spaced apart longitudinally to receive the respective internal teeth 232 and 233, of clutch plates 230 and 231, respectively.

The movable clutch member 216 has wear plates 280 and 281 secured to opposite sides thereof, which wear plates form a side of the respective annular passages 278 and 279, so upon circulation of a cooling fluid therethrough, these wear plates will dissipate heat resulting from the friction member operating thereagainst. The movable clutch member 217 has a wear plate 283 thereon which forms one side of annular passage 219 for passing cooling fluid therethrough in a manner as will be more fully brought out hereinafter.

The end plate 206 has circumferentially spaced holes formed therein which are parallel with the axis of cylindrical housing 202, which holes receive cooling fluid pipes 258, 264, 259, 265, 261, 267, 274 and 284. Each of the respective pipes connect with respective flexible conduits, such as conduits 256 and 266, four of which conduits are cooling fluid inlet conduits and four of which conduits are fluid outlet conduits, as will best be seen in FIG. 4, which conduits connect with a distributor ring 244, which distributor ring receives cooling fluid from an inlet opening 250 within dual rotary fluid seal 252, and which directs fluid into conduit 254 and into the respective inlet conduits 258, 259, 261 and 274 leading to one side of the annular passages, as shown in FIGS. 5, 6, 7 and 8. The fluid passes through the respective annular passages and discharges from these annular passages out through pipes 264, 265, 267 and 284 to be directed into the distributor ring 244, through flexible conduits and thence into and through dual rotary fluid seal 252 and out through outlet 270. In this manner, heat is dissipated from all the wear plates within the clutch or brake, and the movable clutch members 216 and 217 are freely movable because of the yielding of flexible conduits, such as shown in 256 and 266 in FIG. 5.

Each of the movable clutch members 216 and 217 have holes formed therein to surround the respective conduit pipes that pass therethrough, and which holes allow sufficient tolerance to permit axial movement of the movable clutch members 216 and 217. In this manner the multiplate clutches, with two or more plates, can be cooled and the heat dissipated therefrom so that the temperature of the clutch may be maintained within safe operating limits, even though the clutch is slipped continuously.

By having the pipes 258, 259, 261, 264, 265, 267, 274 and 284 arranged in the manner as set out herein, cooling fluid may be piped into the interior of the clutch and fluid directed into fluid contact relation with each of the wear plates with a minimum of external hose connections and yet permit free movement of the internal clutch or brake engaging members and, if used as a clutch, the clutch may be readily balanced statically and dynamically. If used as a brake, the end plate 204, cylindrical housing 202 and end plate 206 may be secured to a non-rotating member by bolts threadably engaging within screw threaded holes 222, so the brake will act in the same manner as set out for the aforementioned form of the invention.

The present arrangement of connecting the pipes and conduits to the various clutch members to receive the maximum of cooling with a minimum of piping enables a compact clutch or brake to be made for use either on rotating or non-rotating devices in accordance with the use of the device. The present clutch is shown to be operated by fluid expansible chamber 228 such as an annular tube, which is well known in the art of clutches and brakes.

Having thus clearly shown and described the invention, what is claimed as new and desired to be secured by Letters Patent is:

1. A fluid actuated friction clutch capable of being continuously slipped, which clutch comprises;
   (a) a body,
   (b) an expansible chamber within the body of said clutch,
   (c) drive and driven friction elements within the body of said clutch,
      (1) at least one of which friction elements is movable, by said fluid expansible chamber, to engage the other of said friction elements,
   (d) annular grooved passages within the body of said clutch,
   (e) said body of said clutch having a fluid inlet formed therein in fluid communication with a side of said annular grooved passages,
   (f) said body of said clutch having a fluid outlet passage formed therein in fluid communication with said annular grooved passages, which fluid outlet is remote from said fluid inlet,
   (g) the body of said clutch having holes formed therein parallel with the axis of said body,
   (h) a rigid conduit connected in fluid communication with said fluid inlet passage and extending outward through one of said holes in the body of said clutch,
   (i) a rigid conduit fitted within another of said parallel holes and being in fluid communication with said outlet passage leading from said annular grooved passages,
      (1) said last rigid conduit leading to the exterior of the body of said clutch,
   (j) a distributor ring mounted on said clutch body and being co-axial therewith, (k) said distributor ring having a plurality of passages formed therein,
(l) lateral conduits connected to said respective rigid conduits and to respective passages in said distributor ring with said lateral conduits lying in close relation to said clutch body,
(m) a further conduit having a plurality of passages formed therein, which further conduit is mounted axially of said clutch body and extends outward therefrom and is rotatable therewith,
(n) at least two of said passages in said axial conduit being in fluid communication with inlet and outlet passages respectively in said distributor ring,
(o) a rotary fluid seal mounted on said axial conduit and being relatively rotatable with respect thereto,
  (1) said rotary seal having a stationary portion, which stationary portion has at least two passages formed therein,
  (2) said passages in said stationary portion of said rotary seal being in fluid communication with respective passages in said axial conduit,
  (3) a source of cooling fluid connected with one of said conduits to circulate fluid therethrough and through the body of said clutch and out through the other of said conduits,
(p) a conduit connected in fluid communication to said expansible chamber and to one of said passages in said distributor ring,
(q) said passage in said distributor ring, which is connected to said expansible chamber, is also connected to one of said plurality of passages in said axial conduit,
(r) a further rotary seal mounted on said axial conduit and being in fluid communication with said last mentioned passage, and
(s) a fluid pressure conduit connected to the stationary portion of said rotary seal to transmit pressure to said expansible chamber in said clutch while said clutch body is being rotated.

2. A fluid actuated friction clutch, as defined in claim 1; wherein
(a) a movable clutch member is positioned intermediate said expansible chamber and a complementally engaging friction member,
  (1) said movable clutch member having annular grooved passages formed therein adjacent one of the friction members,
  (2) said movable clutch member having a fluid inlet formed therein, which is in fluid communication with a side of said annular grooved passages therein,
(b) said movable clutch member having a fluid outlet passage formed therein, which is in fluid communication with said annular grooved passages, which fluid outlet passage is remote from said fluid inlet,
  (1) a rigid conduit connected in fluid communication with the fluid inlet and extends outward through one of said holes in the body of said clutch,
  (2) a further conduit fitted within another of said parallel holes and being in fluid communication with said outlet passage leading from said grooved passages in said movable clutch member,
(c) lateral conduits connected to the respective rigid conduits at the outer ends thereof and to the respective passages in said distributor ring, with the lateral conduits lying in close fitting relation to the body of said clutch, and
(d) said respective passages in said distributor ring connected to the respective inlet and outlet passages in said axial conduit leading to said rotary fluid seal.

3. A fluid actuated friction clutch, as defined in claim 2; wherein
(a) said lateral conduits extending between the ends of said rigid conduit and the passages in said distributor ring are of yieldable material.

4. In combination with a fluid cooled, fluid actuated clutch having a housing with an expansible chamber therein, and having movable and non-movable clutch members, which combination includes;
(a) axially movable and non-movable clutch members having passages formed therein for passage of cooling fluid therethrough,
(b) a distributor ring on the clutch,
  (1) a dual rotary fluid seal for the passage of cooling fluid from a stationary conduit into and out of said distributor ring,
(c) a plurality of rigid conduits connected in fluid communication with the passages in the axially movable clutch member and with the passages in said non-movable clutch member,
  (1) some of said rigid conduits extending through said movable clutch members, which rigid conduits are positioned for relative longitudinal movement with respect to said movable clutch members, and
(d) laterally extending flexible conduits connected to the exterior ends of the rigid conduits and to the fluid passages in the distributor ring.

5. The combination with a fluid cooled, fluid actuated clutch, as defined in claim 4; wherein
(a) said clutch includes at least two movable clutch members each having passages formed therein, some of said rigid conduits are connected in fluid communication with the passages in the respective clutch members, and
(b) some of rigid conduits extend through at least one said movable clutch member, which rigid conduits are positioned for relative longitudinal movement with respect to the axis of both clutch members.

6. The combination with a fluid cooled, fluid actuated clutch, as defined in claim 4; wherein
(a) said rigid conduits, which are connected to at least one movable clutch member, extend outward through the housing parallel to the axis of the clutch and are movable relative thereto.

7. The combination with a fluid cooled, fluid actuated clutch, as defined in claim 5; wherein
(a) said rigid conduits, which are connected in fluid communication with the passages of at least one of said movable clutch members, extend outward through the housing parallel to the axis of the clutch and are movable erlative thereto, and
(b) said rigid conduits which are connected in fluid communication with the passages of said non-movable clutch member extend through said axially movable clutch members parallel to the axis of the clutch and are movable relative thereto.

8. In combination with a fluid cooled fluid actuated brake having a housing with an expansible chamber therein and having movable and non-movable brake members, which combination includes;
(a) the axially movable and non-movable brake members having passages formed therein for passage of cooling fluid therethrough,
(b) a plurality of axially extending rigid conduits connected in fluid communication with the passages in the axially movable brake member and with the passage in said non-movable brake member,
(c) some of said rigid conduits extend through some of said movable brake members, which rigid conduits are positioned for relative longitudinal movement with respect to said movable brake members, and
(d) a distributor ring on the brake, flexible conduits connected between the outer ends of all said rigid conduits and the distributor ring for passage of cooling fluid therethrough.

9. The combination with a fluid cooled, fluid actuated brake, as defined in claim 8; wherein
  (a) said brake includes at least two movable brake members having passages formed therein to each of which brake members said rigid conduits are connected in fluid communication with the passages in the respective brake members, and
  (b) some of rigid conduits extend through at least one said movable brake member, which rigid conduits are positioned for relative longitudinal movement with respect to both brake members.

10. The combination with a fluid cooled, fluid actuated brake, as defined in claim 8; wherein
  (a) said rigid conduits, which are connected to at least one movable brake member, extend outward through the housing parallel to the axis of the brake and are movable relative thereto.

11. The combination with a fluid cooled, fluid actuated brake, as defined in claim 9; wherein
  (a) said rigid conduits, which are connected in fluid communication with the passage of at least one of said movable brake members, extend outward through the housing parallel to the axis of the brake and are movable relative thereto, and
  (b) said rigid conduits which are connected in fluid communication with the passages of said non-movable brake member extend through said axially movable brake members parallel to the axis of the brake and are movable relative thereto.

References Cited

UNITED STATES PATENTS

| | | | |
|---|---|---|---|
| 2,407,043 | 9/1946 | Tremolada. | |
| 2,654,448 | 10/1953 | Benson | 188—264.2 |
| 3,022,867 | 2/1962 | Maloney et al. | |
| 3,038,564 | 6/1962 | Lee et al. | 188—264.2 |
| 3,062,347 | 11/1962 | Hornbostel | 192—113.2 |

BENJAMIN W. WYCHE III, Primary Examiner

U.S. Cl. X.R.

188—264; 192—88